Imp.ᵗ in Lamps, G. Wheeler, Invᵗ.
73415
PATENTED
JAN 14 1868
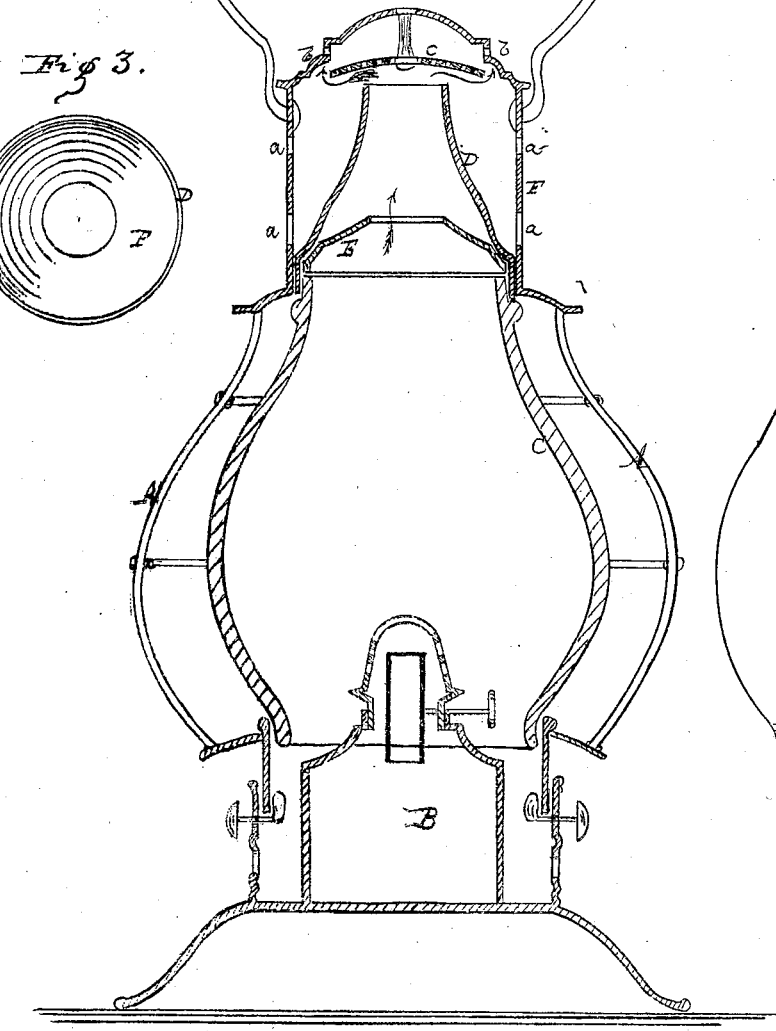
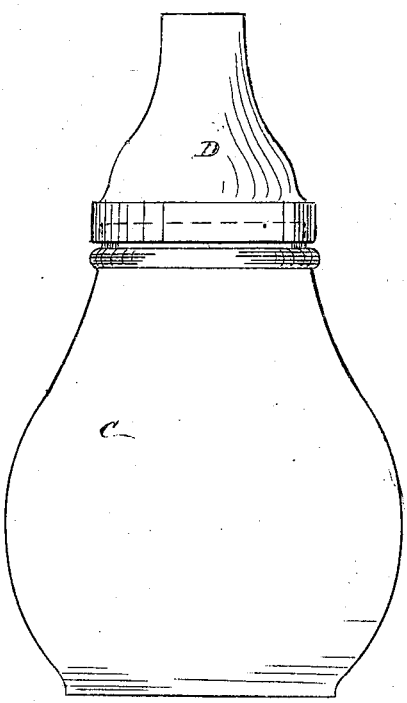
Witnesses
W. E. Mans
John Wheeler
Inventor
George Wheeler

United States Patent Office.

GEORGE WHEELER, OF CHICAGO, ILLINOIS.

Letters Patent No. 73,415, dated January 14, 1868.

IMPROVEMENT IN LANTERNS.

The Schedule referred to in these Letters Patent and making part of the same.

TO ALL WHOM IT MAY CONCERN:

Be it known that I, GEORGE WHEELER, of Chicago, in the county of Cook, and State of Illinois, have invented a new and useful Improvement in Lanterns; and I do hereby declare and make known that the following is a full, clear, and exact description of the same, reference being had to the accompanying drawings, and the letters and figures marked thereon, which form part of this specification.

My said invention consists of the arrangement of a novel device in the lantern-top, to be used in connection with the lantern-globe for the purpose of creating or inducing a current of fresh air up through the said globe, thereby furnishing an adequate supply of oxygen to the burner to support combustion.

To enable those skilled in the art to understand how to construct and use my invention, I will proceed to describe the same with particularity, reference being made in so doing to the aforesaid drawings, in which—

Figure 1 represents a vertical central section of my invention,

Figure 2 is a side elevation of the lantern-globe and its attachment, and

Figure 3 is a bottom view of the said attachment.

Similar letters of reference in the several figures denote the same parts of my invention.

The main features of the lantern may be constructed in any of the known forms, B representing the base, C, the globe, and A the wire guards which serve to protect said globe. D represents a conical tube, or a tube whose lower end may fit closely upon, or be so connected with, the upper part of the globe as to form a continuation thereof, its upper end being smaller by the gradual contraction of the diameter of said tube, as shown. The said conical tube may be secured to the top of the lantern F, so as to be removed from the globe by the removal of the lantern-top, in any suitable manner, or said tube may be permanently attached upon or form a part of the globe itself, in which case it may be of glass, and formed with said globe, and in any case it may be made of any suitable material. Said draught-inducer D extends up nearly to the apex of the lantern, as shown, and over its upper end may be arranged, if desired, a perforated disk, $c$, to prevent the wind or air entering the apertures $b\ b$ from passing down inside the tube D, and checking the draught. Within the said conical tube, at or near its lower end, may be arranged a diaphragm, E, with a central opening, or perforated in any other manner, to permit the passage of air through the same; or two or more of said diaphragms may be used, the object being to increase the draught-power of the arrangement, they having the effect to contract the diameter of said tube nearly for its entire length. Through the lantern-top, near the base of the tube D, and below the top of the said tube, are perforations, $a\ a$, through which the air enters, and passing by the top of cone, and out at the upper openings $b\ b$ aforesaid, tend to increase the draught through the globe, as desired.

By the application of my invention, a lantern is produced in which a clear, bright light is produced, and one which can scarcely be blown out by the wind, or by sudden movements of the lantern.

Having described the construction and operation of my invention, I will specify what I claim, and desire to secure by Letters Patent.

1. I claim the arrangement of the conical tube or chimney D with the globe of a lantern, substantially as and for the purposes specified.

2. I claim providing said chimney D with one or more diaphragms E, arranged and operating substantially as and for the purposes set forth.

3. I claim, in combination with the said chimney D, and the openings $b\ b$ in the lantern-top, the arrangement of the perforated disk $c$, in the manner and for the purposes described.

4. I claim the arrangement of the draught-openings $a\ b$ in the lantern-top with the chimney D, operating substantially as described.

GEORGE WHEELER.

Witnesses:
  W. E. MARRS,
  JOHN WHEELER.